Figure 1:
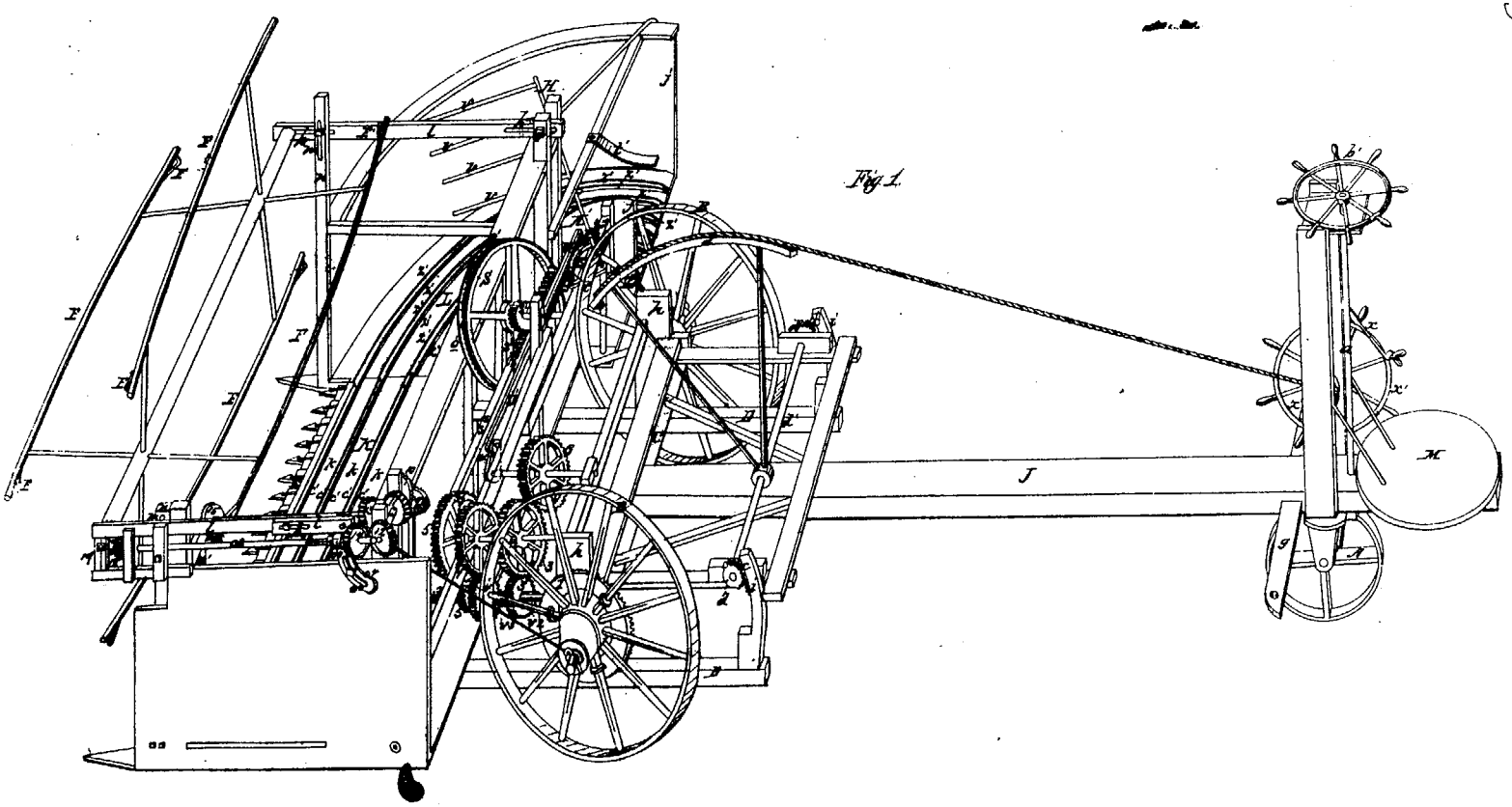

56 - HARVESTERS.

154

Sheet 1. 3 Sheets

N. Platt.

[W. H. Seymour and D. S. Morgan, Assignees.]

Harvester Rake.

No. 591.

Reissued Aug. 31. 1858.

154
Sheet 2. 3 Sheets.
N. Platt,
[W. H. Seymour and D. S. Morgan, Assignees.]
Harvester Rake.
No. 591. Reissued Aug. 31. 1858.
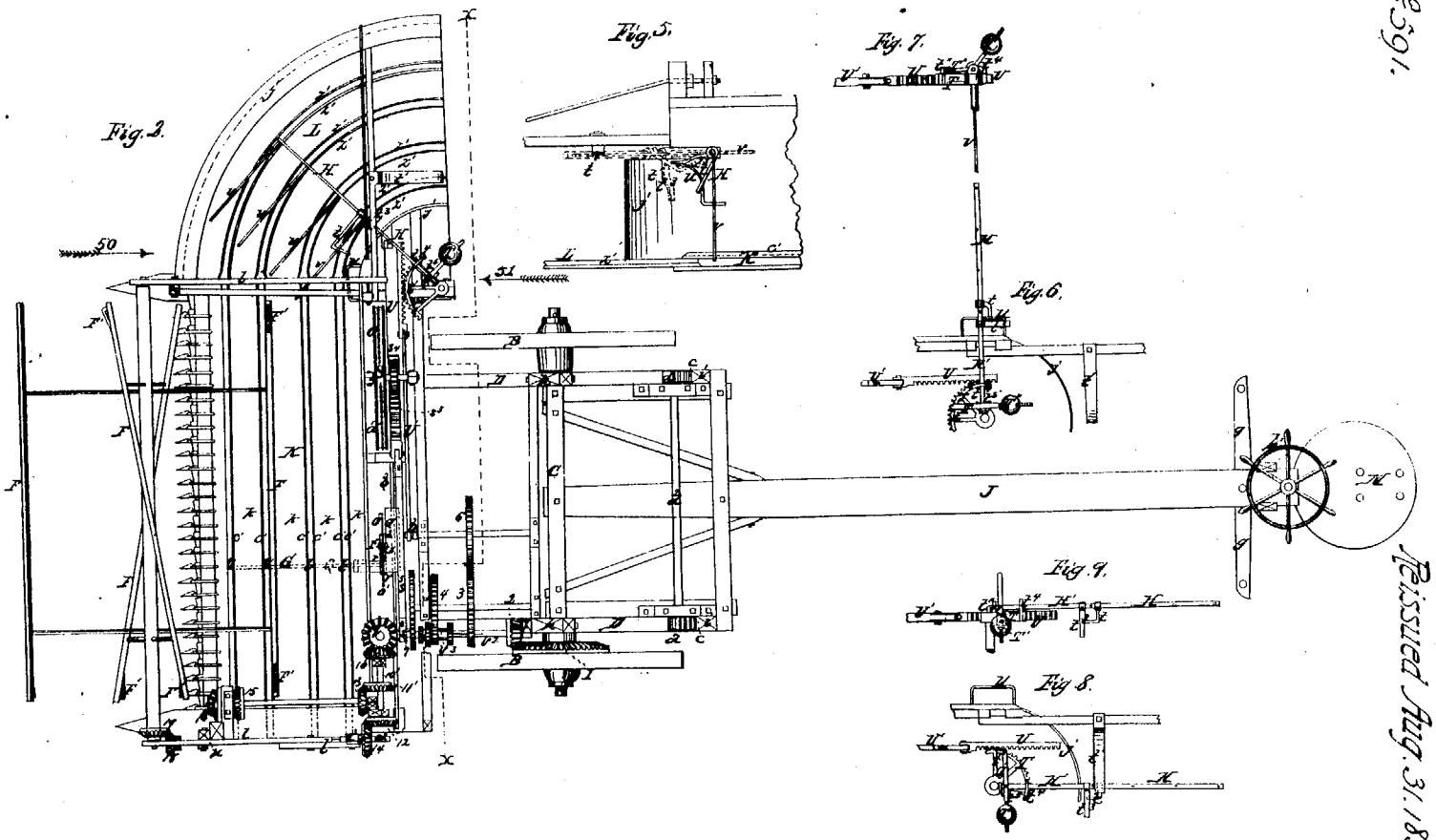

N. Platt, (Sheet 3. 3 Sheets.)
[W. H. Seymour and D. S. Morgan, Assignees]
Harvester Rake.
No. 591. Reissued Aug. 31. 1858.
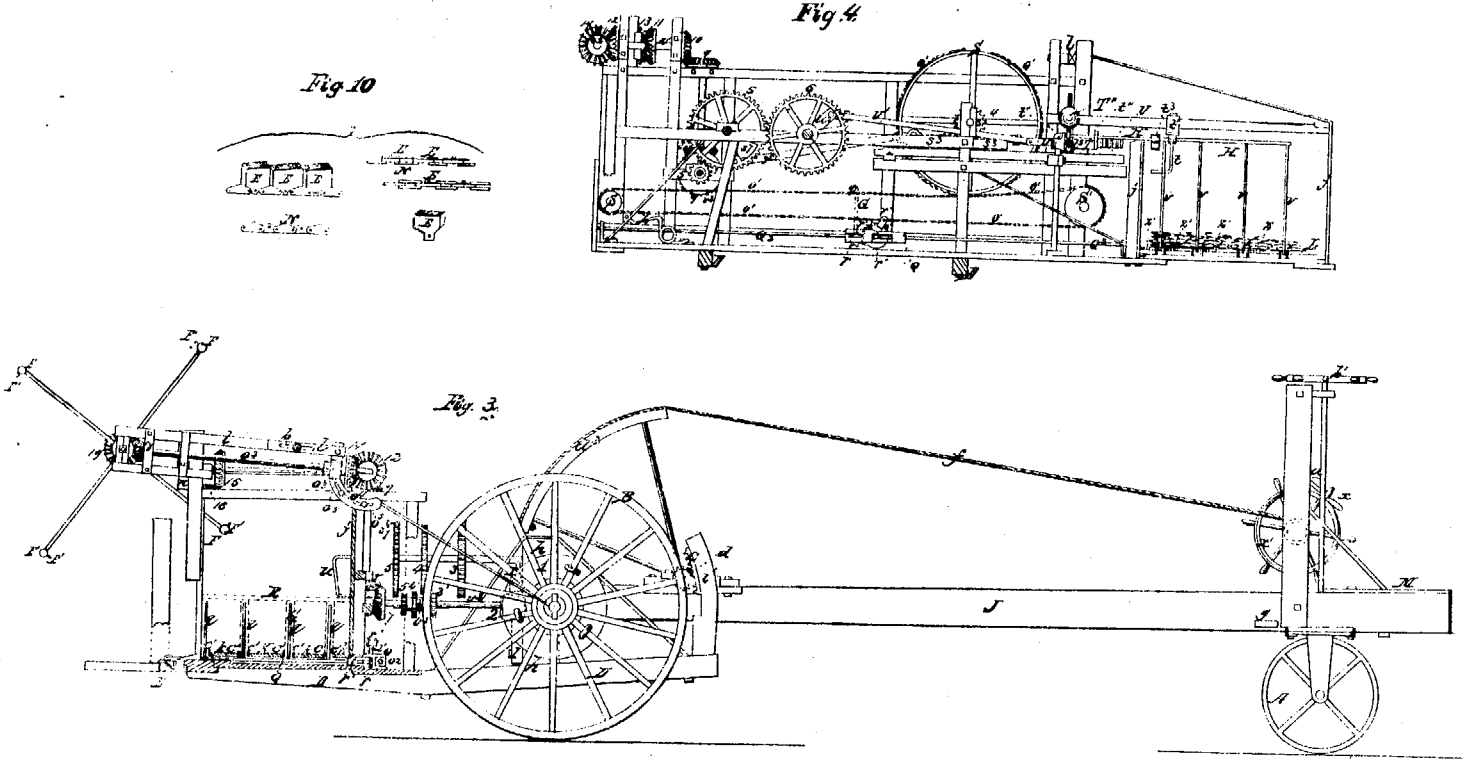

UNITED STATES PATENT OFFICE.

W. H. SEYMOUR AND D. S. MORGAN, OF BROCKPORT, NEW YORK, ASSIGNEES OF N. PLATT.

IMPROVEMENT IN HARVESTERS.

Specification forming part of Letters Patent No. 6,517, dated June 12, 1849; Reissue No. 265, dated May 23, 1854; Reissue No. 591, dated August 31, 1858.

DIVISION B.

*To all whom it may concern:*

Be it known that NELSON PLATT, formerly of Ottawa, in the county of La Salle and State of Illinois, late of Kendall county, in the same State, (assignor to WILLIAM H. SEYMOUR and DAYTON S. MORGAN, of Brockport, in the county of Monroe and State of New York,) did invent a new and useful Improvement in Machines for Cutting and Raking Grain or Grass, of which the following is a full, clear, and exact description, reference being had to the accompanying drawings, which make part of this specification, and in which—

Figure 1 represents a view in perspective, and Fig. 2 a plan or top view, of a machine embracing the said improvement. Fig. 3 represents an elevation of that side of the machine which runs next to the uncut grain, a portion of the frame being removed to expose a part of the raking mechanism and the cutting apparatus. Fig. 4 represents an elevation, seen from the rear, of that part of the machine which is in front of a vertical plane shown by the line *x x* of Fig. 2. Figs. 5, 6, 7, 8, and 9 represent part of the sweep or oscillating rake and the mechanism for working it in different attitudes and positions, Fig. 5 representing an elevation inside of the platform, seen in the direction of the arrow 50, Fig. 6 representing a plan when the rake has the position shown by the black lines in Fig. 5, Fig. 8 representing a plan when the rake has another position, and Figs. 7 and 9 representing elevations, seen in the direction of the arrow 51, with the rake in two different positions.

The said improvement consists in the combination of a sweep-rake and the mechanism for operating the lever which vibrates it in such a manner that the mechanism will not be liable to obstruction by the grain, or by leaves or other matter mixed with the grain, while it is being raked off the platform.

The machine is to be drawn by horses walking on each side of a beam, J, to which they are connected in the usual manner by whiffletrees. Under the rear end of this beam is a guide-wheel, A, capable of being turned in any required direction by means of a vertical shaft, *a*, having upon its upper end a steering-wheel, *b'*. Upon the rear end of this beam J is placed a stand, M, for the attendant, who drives the horses, guides the machine, and by means of a hand-wheel, *x'*, which can be held in any required position by a pawl, *x*, raises or lowers the platform, cutting apparatus, &c. The beam J is connected in front of the space for the horses with the axle C of the two carrying-wheels B B. It also carries a frame which supports a rock-shaft, *d'*, with pinions *d d* on its ends, operated by the quadrant-lever $d^2$, cord *f*, and hand-wheel *x'*.

The platform, cutting apparatus, reel, raking mechanism, &c., are attached to two horizontal beams, D D, which are suspended from the axle C by two vertical pieces, *h h*. These beams D D carry studs *i i*, to which are attached curved racks *c c*, into which the pinions *d d* gear, and when operated by the above-described mechanism raise or lower the platform, cutting apparatus, &c., the whole turning upon the axle C as a center or fulcrum.

Motion is communicated to the cutters, reel, and raking mechanism by a bevel-wheel, 1, upon one of the carrying-wheels B, which also acts as a driving-wheel. This bevel-wheel engages with a bevel-pinion, 2, driving a shaft, $v^2$, which carries a sliding sleeve, $V^3$, (which is prevented from turning upon the shaft by a feather and groove,) upon which are three pinions, 3', 4', and 5', which, being of unequal sizes and gearing respectively with three wheels, 3, 4, and 5, allow different rates of motion to be communicated to the raking mechanism, so that the size of the sheaves of cut grain may be varied at pleasure. This sleeve $V^3$ may be shifted by a clutch-lever or by hand to bring into gear any one of the pinions required.

The sweep or vibrating rake H receives its motion from one, 3, of the wheels which have already been mentioned in connection with the shifting-gear. This wheel engages with another wheel, 6, which, by means of a crank-pin, $u^2$, and pitman U', gives a reciprocating motion to the rack U, gearing into a quadrant, T, which carries a lever, H', prolonged to form the head of the rake H. This lever is so arranged as to be susceptible of partial rotation upon its axis, and is held from rising by a staple, $t^4$, which allows a slight backward and forward motion of the rake upon the quadrant. Upon the lever H′, and at right angles to it, is secured a weighted lever or tumbler T″, which, when the head of the rake is free to turn on its axis, brings the teeth $v$ into a horizontal position, as shown in Figs. 1, 2, and 9, and also in red in Fig. 5, and retains them in this position, while the rake is carried back by the rack and quadrant to the point at which it is required to turn the teeth down again into a vertical position behind the grain to be discharged from the platform.

A stop, $t^5$, is placed on the quadrant beneath the tumbler T″ to prevent it from descending lower than is necessary for bringing the teeth into a horizontal position.

Upon the rake-head are fastened two arms or levers, $t$ $t^3$, which are so arranged in relation to the teeth that when the rake is carried backward one of them, $t$, at its bent end, comes in contact with a stop or guide, $u$, just at the point where it is necessary that the teeth of the rake should assume their vertical position to seize the grain, as seen in red in Fig. 5. The further backward motion of the rake, the arm $t$ bearing against the guide $u$, causes the rake-head to rotate upon its axis sufficiently to bring the teeth into a vertical position, when the other arm, $t^3$, slides horizontally over the top of the guide, as is shown in black in Figs. 5 and 6.

Another arm, T‴, acting as a latch, projects from the lever H′, prolonged to form the head of the rake H, in a direction opposite to the tumbler T″, and nearly at right angles to the plane of the teeth $v$ of the rake, as seen in Figs. 6, 7, 8, and 9. When the teeth are brought into a vertical position in the manner above described this last-named arm or latch, T‴, is brought down in front of a catch or hook, $t''$, upon the quadrant T, as shown in Fig. 6. When the quadrant again commences to move forward the arm $t^3$, moving horizontally over the guide $u$, still holds the teeth vertical, while the staple or slot $t^4$, being wider than the lever H′, moves over the latter a short distance to bring the catch $t''$ over the latch T‴, which then lies in front of it, and the rake is then carried forward, with its teeth firmly held in a vertical position by the latch and catch, as shown in Fig. 7, while it turns the grain and sweeps it off the platform L. As the rake completes its forward motion the head is brought under a spring, $t'$, as shown in Fig. 8, which opposes sufficient resistance to the return of the rake, when the motion of the quadrant is reversed, to hold it, while the staple $t^4$ permits the quadrant to move backward far enough to disengage the latch T‴ from the hook $t''$, as shown in Fig. 9, when the rake is again turned to bring its teeth into a horizontal position by the weighted lever T″ and carried back, with its teeth point foremost, in that position to lift them over and clear of the grain upon the platform.

The guards or fences $j$ on the platform prevent the grain from leaving the curved path described by the teeth of the rake, and within the inner one of these guards, or that nearest the center of vibration of the lever which carries the rake, the gearing which gives the back-and-forth motion to the rake is placed. The gearing, thus arranged within the inner portion or inner circle of the platform, is shielded from contact with the grain or other matter, which might else become entangled in it and impede or obstruct its operation.

The devices above described for giving motion to the rake may be constructed and arranged as represented, or in various other ways well known to persons skilled in the art of constructing reaping-machines, and which therefore do not require a more particular description; but it is essential that the gearing, whatever it may be, which operates upon the rake-head, or the lever which carries it, should be arranged relative to the inside of the platform, as described.

The operation of the machine is as follows: As the wheel to which the gear is attached travels over the ground the machinery is set in motion, the reel presses the standing grain back against the cutters, which sever it, when it falls upon the platform and is raked forward in a direction parallel to the cutters, and at right angles to the path of the machine, until it reaches the curved portion of the platform, when the sweep-rake takes it and conveys it over the curved portion of the platform, and while conveying it turns its stalks at right angles, or thereabout, to the direction in which they fall upon the platform, and when so turned discharge them upon the ground to make a sheaf. This operation of the rake is repeated at regular intervals, which should not be so far apart as to make the sheaves too large and unwieldy, nor so frequent as to make the sheaves too small.

What is claimed under this patent as the invention of the said NELSON PLATT is—

The combination of the vibrating sweep-rake with the lever carrying the same, vibrated by gearing located within the inner edge or circle of said platform, as herein set forth.

In testimony whereof we have hereunto subscribed our names.

WM. H. SEYMOUR.
D. S. MORGAN.

In presence of—
GEO. H. ALLEN,
JAMES ROBY.